Figure 1:
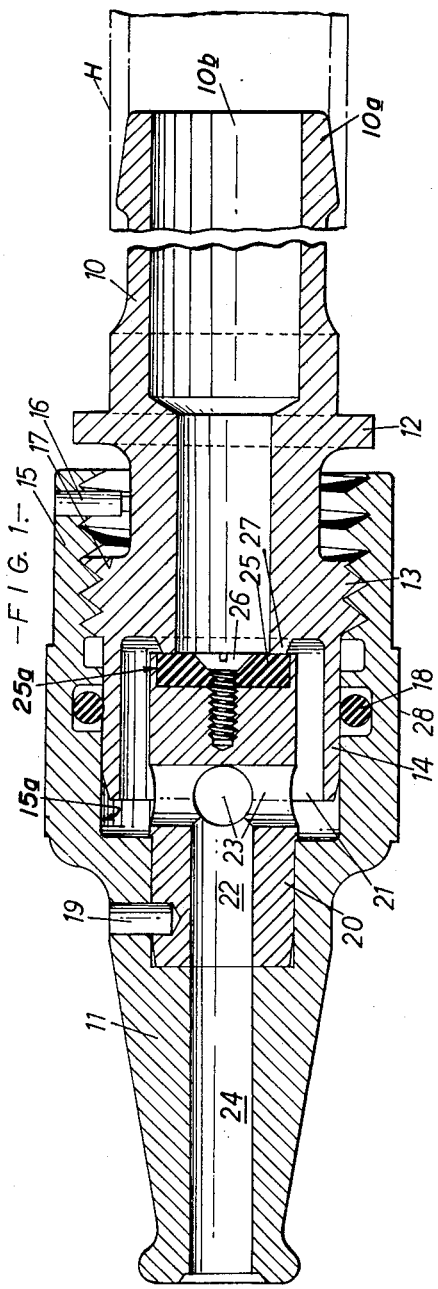

Dec. 11, 1962  E. HOOPER  3,067,954
FLUID-FLOW CONTROL VALVES
Filed June 2, 1961  3 Sheets-Sheet 1

INVENTOR:
Edward Hooper
BY
Johnson and Kline
ATTORNEYS

Dec. 11, 1962  E. HOOPER  3,067,954
FLUID-FLOW CONTROL VALVES
Filed June 2, 1961  3 Sheets-Sheet 2

INVENTOR:
Edward Hooper
BY
ATTORNEYS

Dec. 11, 1962  E. HOOPER  3,067,954
FLUID-FLOW CONTROL VALVES
Filed June 2, 1961  3 Sheets-Sheet 3
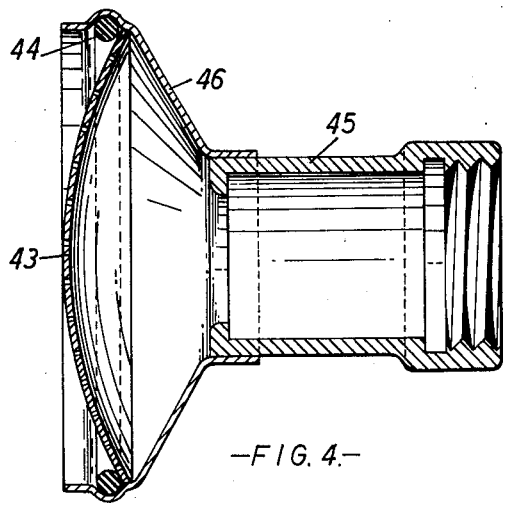
—FIG. 4.—
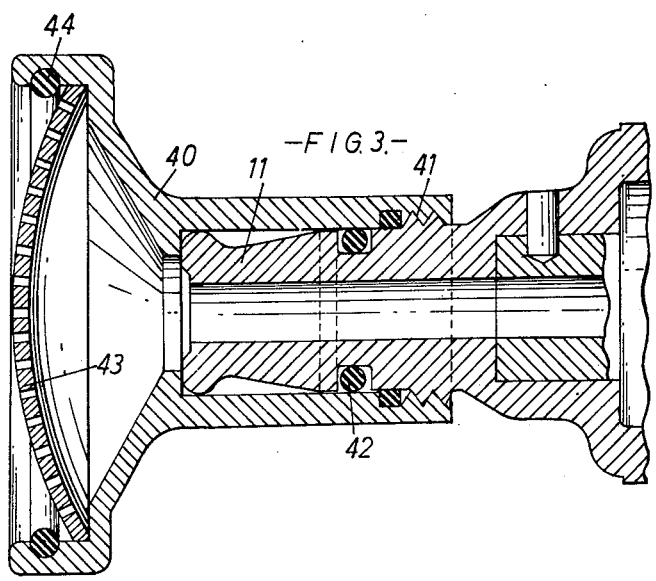
—FIG. 3.—
INVENTOR:
Edward Hooper
BY
Johnson and Kline
ATTORNEYS

United States Patent Office

3,067,954
Patented Dec. 11, 1962

3,067,954
FLUID-FLOW CONTROL VALVES
Edward Hooper, South Shields, England, assignor of one-half to Aero & Engineering (Merseyside) Limited, Wirral, Cheshire, England
Filed June 2, 1961, Ser. No. 114,388
Claims priority, application Great Britain July 22, 1960
5 Claims. (Cl. 239—458)

This invention is for improvements in or relating to fluid-flow control valves.

One object of the invention is to provide a valve which is particularly although not exclusively suitable for use at the discharge end of a fire hose or the like, the valve being embodied compactly and efficiently in a nozzle for the hose.

According to the present invention, there is provided a fluid-flow control valve comprising two members, each having a passage for the flow of fluid through it, mated together so that relative rotation or angular movement of one member relative to the other causes relative axial or longitudinal movement between them for the adjustment of a valve proper positioned between the two passages. Preferably the passages are co-axial.

According to a further feature of the present invention there is provided a fluid-flow control valve comprising an inlet pipe or the like and an outlet pipe or the like mated together so that relative rotation or angular movement of one with respect to the other causes relative axial or longitudinal movement between them, and a valve proper adapted to be moved or permitted to move by said axial or longitudinal movement.

According to a still further feature of the invention, there is provided a fluid-flow control valve comprising an inlet pipe or the like and an outlet pipe or the like mated together so that relative rotation or angular movement of one with respect to the other causes relative axial or longitudinal movement between them, a valve seat in or on one of the said pipes and a valve member proper associated with the other pipe so that said axial or longitudinal movement will cause or allow said valve proper to move with respect to said valve seat.

In applying the invention to a nozzle, for a fire hose, one of said pipes is adapted to be secured to the hose and the other pipe is shaped to provide a nozzle proper or jet.

In preferred embodiments one member or pipe is screwed on to the other member or pipe and is tightened or slackened thereon according to whether it is desired to close or open the valve.

Figure 2:
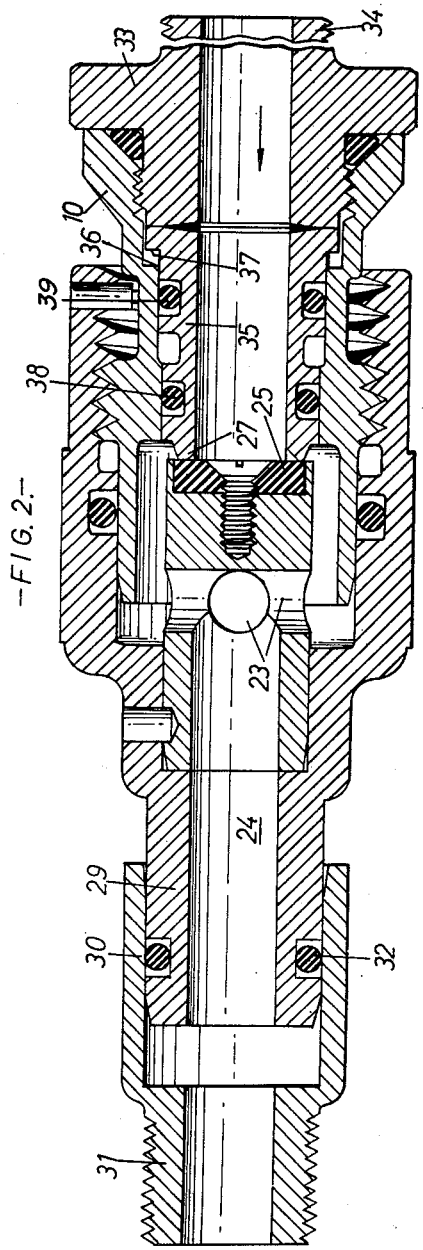

Some embodiments of the invention will now be described by way of example with reference to the accompanying drawings wherein:

FIGURE 1 is a longitudinal sectional view and shows an application of the invention to a combined nozzle or jet and valve for a fire hose, FIGURE 2 is a longitudinal sectional view of an application of the invention to a valve for location in a pipe line, hose or the like intermediate its ends, FIGURE 3 shows a spray attachment for a fire hose, and FIGURE 4 shows a modification of FIGURE 3.

Referring first to the embodiment of the invention shown in FIGURE 1, this comprises a pipe section 10, having a bore 10b, and a jet or nozzle section 11. The pipe section 10 has a part 10a adapted to be secured in and to make a fluid-tight joint with an end of the fire hose H.

At its forward end the pipe section 10 is formed with a flange 12, a screw threaded part 13 and a tubular extension or skirt 14.

The nozzle part 11 is formed at its rear with a hollow extension or housing 15 which is screw threaded internally so as to screw on to the thread 13 as shown. The part 15 has a socket 15a which slidably receives the skirt 14.

The arrangement is such that the part 11, 15 can be screwed along the screw thread 13 in either direction, but is prevented from being completely detached from the part 10 by means of a pin 16 which comes up against a shoulder 17, on the part 10, after the part 11 has been screwed along the part 10 to a predetermined extent in the valve opening direction. For some purposes (e.g. in the case of a fire hose) it is preferable to finish off the pin 16 so that it is difficult if not impossible to remove it. Where it may be desirable to take the valve and nozzle apart for cleaning or replacement of worn parts, the pin 16 may be made and fitted so that it can be removed when required.

An O-ring 18 or other sealing device of rubber or like material is provided between the part 15 of the nozzle and the skirt 14 so as to ensure a fluid tight joint between these parts, which, at the same time, permits the required relative rotation to take place between the part 11, 15 and the part 10.

Secured in the nozzle 11, 15 by a pin 19 is a valve adaptor 20 which projects back into the skirt 14 there being substantial clearance as indicated at 21 between the valve adaptor and said skirt.

The valve adaptor 20 has a bore 22 which extends from a cruciform arrangement of ports 23 to the bore 24 of the nozzle 11.

At its rear end the valve adaptor is provided with a valve washer 25 (e.g. of synthetic rubber or similar material) which is bonded in a recess 25a in the adaptor so that its periphery is well shrouded to prevent spreading. In addition, to securing the washer to the valve adaptor by an adhesive, it is also secured thereto by a screw 26 as an additional precaution.

The valve washer 25, in the closed position of the valve, bears against an annular valve seating 27 on the part 10.

The hollow extension 15 of the nozzle 11 is provided externally with an annular knurled area 28 which provides a hand grip for turning the part 11 relatively to the part 10 when it is required to open or close the valve. The part 15 may also be inscribed externally with the words "ON" and "OFF," spaced circumferentially around it, associated with arrows to give an indication of the direction in which the part 15 should be turned in order to open or close the valve.

It will be appreciated that when the nozzle part 11, 15 is screwed along the threaded part 13 of the pipe section 10, to the left within the limits permitted by the pin 16, the valve washer 25 will leave the seat 27 and water or other fluid can flow from the pipe 10 via the space 21, ports 23 and bore 22 to the bore 24 of the nozzle. The extent by which the nozzle part 11, 15 is screwed along the threaded part of the pipe section 10, will, of course, determine the amount of opening of the valve and the amount of water or other fluid which passes therethrough.

Similarly, by screwing the nozzle part 11, 15 back along the threaded part 13 of the pipe section 10 the washer 25 can be applied firmly to the seat 27 so as to close the valve.

The concentric or co-axial construction of the nozzle-valve above described is ideally suited for mass production on automatic machines and furthermore promotes an even and steady flow of fluid through the valve and nozzle.

By making the thread 13 fairly coarse a quick opening and closing action can be achieved with a small hand movement whilst, at the same time, the flow can be varied from a few drops to the maximum.

The embodiment shown in FIGURE 2 is similar in many respects to that already described with reference to FIGURE 1 and where applicable like reference numerals have been used to designate like parts.

In the embodiment shown in FIGURE 2, the nozzle or jet portion 29 is a sliding fluid-tight fit in the socket 30 of an adaptor 31. The fluid-tight joint between the nozzle 29 and the socket 30 is provided by a rubber or similar O-ring 32 housed in an angular recess in the nozzle 29.

The body part 10 of the valve is provided at its rear end with an adaptor or coupling unit 33 having a part 34 adapted to be secured in the end of a hose in a fluid tight manner.

It will also be noted that in the construction shown in FIGURE 2, the valve seating 27 is on a "floating" valve seat member 35 which can follow up movement of the valve washer 25 within the limits permitted by a shoulder 36 on the valve body 10 and a shoulder 37 on said floating seat member 35. Rubber or other O-rings or similar sealing devices are provided as indicated at 38 and 39 between the floating valve seating 35 and the valve body 10 to provide a fluid tight joint therebetween. The arrangement just described ensures good and effective seating of the washer 25 on the valve seating 27 over a very prolonged period.

To overcome the possibility of water hammer or chatter, particularly when the valve is almost at the fully closed position, provision is made to ensure that hydraulic pressure in the inlet end of the valve, acting on the floating valve seating 35, is greater in the direction of flow (indicated by the arrow) than in the reverse direction. In other words, the hydraulic pressure on the floating valve seating 35 is not balanced but is greater in the one direction than the other. With this object in view, the O-ring 39 is made larger than the O-ring 38.

To close the valve, the valve washer 25, first contacts the annular valve seating 27, this being a part of the "floating" member 35. Continued movement in the closing direction then forces the floating member 35 to adjoin the inner end of the adaptor or coupling unit 33, thereby leaving a space between the shoulders 36 and 37.

In this position, the pressure, acting on the floating member over an area equivalent to the outside diameter of the O ring 39, forces the floating valve seat member 35 against the valve washer 25. The load on the floating member exerted against the valve washer increases in relation to any increase in pressure in the system. By this means, the valve will hold against much higher pressures than the form described in FIGURE 1.

FIGURE 3 shows how the nozzle or jet of a fire hose as previously described with reference to FIGURE 1 can be fitted with a removable spray attachment. This spray attachment comprises a body part 40 adapted to screw on to the nozzle 11 which is provided with a thread 41 for this purpose. An O-ring or other sealing member 42 provides a fluid-tight joint.

The body part 40 of the spray attachment is flared or enlarged at its forward part and fitted with a convex perforated diaphragm 43 which is held in position by a spring ring 44. By this arrangement the diaphragm can be changed if required to provide a fine or a heavy spray or different forms of spray to suit different circumstances.

FIGURE 4 shows a modification of the spray attachment shown in FIGURE 3, adapted to be used with the embodiment of the invention shown in FIGURE 2, the body of the spray attachment in this case comprising a tubular part 45 adapted to be screwed on to the threaded part 31 of the adaptor 30 and a separately spun or formed housing 46 for the diaphragm 43. The housing 46 may be sweated or similarly secured to the part 45.

I claim:

1. A hose nozzle comprising in combination a pipe part and a nozzle part having co-axial bores, the pipe part having, at its rear, securing means for securing it in an end of a hose, a tubular skirt, a valve seat within said skirt and, intermediate said securing means and said skirt an externally coarse-screw-threaded part, and the nozzle part having a socket which slidably receives said tubular skirt and an internally screw threaded part screwed onto said externally screw threaded part of the pipe part for axial movement of the nozzle part therealong, sealing means located between said socket of the nozzle part and said skirt of the pipe part thereby to isolate the bore of the pipe part from the screw threaded parts of the pipe part and the nozzle part, a valve adaptor projecting back into said skirt and spaced from the inner surface thereof to provide a fluid flow passage, said valve adaptor having an axial bore which communicates with the bore of the nozzle part, at least one radial bore extending from the bore of the valve adaptor to said fluid flow passage and a valve washer shrouding recess in its rear end, a valve washer in said recess of the valve adaptor operative to close onto said valve seat, means securing said valve adaptor to the nozzle part thereby to participate in said axial movement thereof and whereby screwing and unscrewing of the nozzle part on the pipe part moves said valve member to a closed and open position respectively with respect to said valve seat, and co-operating stop means on the pipe part and the nozzle part whereby said axial movement of the nozzle part is limited and complete detachment of the nozzle part from the pipe part is prevented.

2. A hose nozzle as claimed in claim 1 and having a spray attachment fitted spigot and socket fashion to its forward end, said spray attachment having a flared forward part, means connecting it in a fluid type manner to the forward end of the nozzle part, a convex perforated diaphragm and means removably holding said diaphragm in the flared forward part of the spray attachment.

3. A hose nozzle comprising in combination a pipe part and a nozzle part having co-axial bores, the pipe part having, at its rear, securing means for securing it in an end of a hose, a tubular skirt and intermediate said securing means and said skirt an externally coarse-screw-threaded part, and the nozzle part having a socket which slidably receives said tubular skirt and an internally screw threaded part screwed onto said externally screw threaded part of the pipe part for axial movement of the nozzle part therealong, a valve seat member slidably positioned in said pipe part and having a valve seat located at the inner end of said skirt, sealing means located between said socket of the nozzle part and said skirt of the pipe part whereby to isolate the bore of the pipe part from the screw threaded parts of the pipe part and the nozzle part, a valve adaptor projecting back into said skirt and spaced from the inner surface thereof to provide a fluid flow passage, said valve adaptor having an axial bore which communicates with the bore of the nozzle part, at least one radial bore extending from the bore of the valve adaptor to said fluid flow passage and a valve washer shrouding recess in its rear end, a valve washer in said recess of the valve adaptor operative to close onto said valve seat, means securing said valve member to the nozzle part thereby to participate in said axial movement thereof and whereby screwing and unscrewing of the nozzle part on the pipe part moves said valve member to a closed and open position respectively with respect to said valve seat, and co-operating stop means on the pipe part and the nozzle part whereby said axial movement of the nozzle part is limited and complete detachment of the nozzle part from the pipe part is prevented.

4. A hose nozzle comprising in combination a pipe part having, at its rear, securing means for securing it in an end of a hose, a tubular skirt and, intermediate said securing means and said skirt an externally coarse-screw-threaded part, a valve seat member slidably positioned in said pipe part and having a valve seat located at the inner end of said skirt, axially spaced sealing rings between said valve seat member and the bore of the pipe part one of said sealing rings having a greater diameter than the other and being located further towards the inlet end of the pipe part whereby the hydraulic pressure of fluid passing through the hose nozzle and acting on the slidable valve seat member is greater in the direction of flow than in the reverse direction, a nozzle part having a socket which slidably receives said tubular skirt and an internally screw threaded part screwed onto said externally screw threaded part of the pipe part for axial movement of the nozzle part therealong, sealing means being located between said socket of the nozzle part and said skirt of the pipe part thereby to isolate the bore of the pipe part from the screw threaded parts of the pipe part and the nozzle part, a valve adaptor projecting back into said skirt but spaced from the inner surface thereof to provide a fluid flow passage and operative to close onto said valve seat, means securing said valve adaptor to the nozzle part thereby to participitate in said axial movement thereof and whereby screwing and unscrewing of the nozzle part on the pipe part moves said valve adaptor to a closed and open position respectively with respect to said valve seat, and co-operating stop means on the pipe part and the nozzle part whereby said axial movement of the nozzle part is limited and complete detachment of the nozzle part from the pipe part is prevented.

5. A hose nozzle comprising in combination a pipe part and a nozzle part having coaxial bores, the pipe part having, at its rear, securing means for securing it in an end of a hose, a tubular skirt and, intermediate said securing means and said skirt, an externally coarse-screw-threaded part, and the nozzle part having a socket which slidably receives said tubular skirt and an internal screw threaded part screwed onto said externally screw threaded part of the pipe part for axial movement of the nozzle part therealong, a valve seat member slidably positioned in said pipe and having a valve seat located at the inner end of said skirt, sealing means located between said socket of the nozzle part and said skirt of the pipe part whereby to isolate the bore of the pipe part from the screw threaded parts of the pipe part and the nozzle part, a valve adaptor projected back into said skirt and spaced from the inner surface thereof to provide a fluid flow passage, said valve adaptor having an axial bore which communicates with the bore of the nozzle part, at least one radial bore extending from the bore of the adaptor to said fluid flow passage and a valve washer shrouding recess, a valve washer in said recess in the valve adaptor and operative to close onto said valve seat means securing said valve adaptor to the nozzle part thereby to participate in said axial movement thereof and whereby screwing and unscrewing of the nozzle part on the pipe part moves said valve washer to a closed and open position respectively with respect to said valve seat, and co-operating stop means on the pipe part and the nozzle part whereby said axial movement of the nozzle part is limited and complete detachment of the nozzle part from the pipe part is prevented.

References Cited in the file of this patent
UNITED STATES PATENTS

| | | |
|---|---|---|
| 229,695 | Granger | July 6, 1880 |
| 506,846 | Felthauser | Oct. 17, 1893 |
| 612,934 | Schraubstadter | Oct. 25, 1898 |
| 627,073 | Cliff | June 13, 1899 |
| 902,309 | Williams | Oct. 27, 1908 |
| 1,604,252 | Banfil | Oct. 26, 1926 |
| 2,605,143 | Bishop | July 29, 1952 |
| 2,837,323 | Goodrie | June 3, 1958 |
| 2,985,385 | Bowers | May 23, 1961 |
| 2,989,250 | Simon | June 20, 1961 |